United States Patent [19]

Searby

[11] Patent Number: 4,611,232
[45] Date of Patent: Sep. 9, 1986

[54] VIDEO PROCESSING SYSTEM FOR PICTURE ROTATION

[75] Inventor: Anthony D. Searby, Newbury, England

[73] Assignee: Quantle Limited, Newbury, England

[21] Appl. No.: 475,580

[22] Filed: Mar. 15, 1983

[30] Foreign Application Priority Data

Mar. 19, 1982 [GB] United Kingdom ............... 8208053

[51] Int. Cl.$^4$ .............................................. H04N 5/14
[52] U.S. Cl. .................................. 358/160; 358/21 R; 340/727; 340/728; 382/46
[58] Field of Search ............... 358/160, 21 R, 22, 138, 358/183; 340/727, 728; 382/46

[56] References Cited

U.S. PATENT DOCUMENTS 4,286,291  8/1981  Taylor et al. ...................... 358/138
4,437,121  3/1984  Taylor et al. ...................... 358/160
4,468,688  8/1984  Gabriel et al ...................... 358/183

Primary Examiner—James J. Groody
Assistant Examiner—Michael D. Parker
Attorney, Agent, or Firm—Cooper, Dunham, Griffin & Moran

[57] ABSTRACT

A rotation system includes an input buffer 14 allowing two lines of video information to be processed in interpolator 15 prior to receipt by a framestore 16. The desired rotational angle is selected by selector 17 and the angle information is used within calculator 18 to determine the modified framestore address sequence to be accessed to receive the interpolated data and the interpolation values used within processor 15. The rotated information stored is available for read out under the control of generator 19 to be displayed on monitor 53.

27 Claims, 11 Drawing Figures

VIDEO PROCESSING SYSTEM FOR PICTURE ROTATION

BACKGROUND OF THE INVENTION

This invention relates to a video processing system to allow a video image to be stored in a frame store at a selected rotational angle.

In television broadcasting for example there is often a requirement to rotate a video image for use in special effects. It has been should in U.K. patent application No. 8108467 (U.S. patent application Ser. No. 246,970) that this can be achieved by storing the video signal frame by frame in a digital frame buffer and then reading out each frame using a modified addressing mechanism such that the resultant image is a rotated form of the original.

FIG. 1 shows an example of the addressing mechanism used in the above referenced patent application that is required to produce this rotated image (O/P raster). In this example in order to calculate the new address B from the previous address A we add on two incremental steps dX and dY where for no compression $dX = 1 \times \cos O$ and $dY = 1 \times \sin O$ where O is the angle of rotation.

If the position of pixel A when projected onto the framestore raster is X,Y then the position of B will be $X+dX$, $Y+dY$. This co-ordinate position is non-integer and so we can calculate the surrounding picture points, P, Q, R and S which we need to calculate the new pixel value for the position B by taking the integer part of B's co-ordinate. The remainder (or fractional part) dX and dY is used to calculate the relative weightings of the pixel values at P, Q, R and S in order to provide a correctly interpolated pixel value of the position B.

In the example shown in FIG. 1, point B to be synthesised is in a co-ordinate position equivalent to location 3,1 in the output raster, and in a position 2.68, 1.82 in the frame store raster. Point P for example is in co-ordinate position 2,1 in the frame store raster and the remainder (or fractional) values 0.68 and 0.82 are used as interpolation factors for points P, Q, R and S adjacent the point B to be synthesised.

A step in the Y direction from G to H for the start of the next line, is calculated in a similar manner.

This scheme works well when we are dealing with a framestore where the data is stored in a normal fashion and we are creating the rotated image on its output. However, when we wish to build up a rotated image into the framestore then this method of calculating the appropriate addresses and interpolation factors cannot be used and one approach to overcome this problem is to devise a system as shown in FIG. 2. In this arrangement a framestore 10 with associated processor 11 corresponds to the configuration 12 forming the subject of above referenced patent application. In addition, a further framestore 13 is provided so that the rotated output from processor 11 can be presented as an incoming signal to this latter framestore. Thus whilst this system of FIG. 2 meets the requirement of building up a rotated picture into a framestore this adds considerable expense to the system as two frame stores are required to achieve the desired processing function.

An object of the present invention is directed to providing a rotation system capable of processing incoming picture information without relying on a second framestore.

SUMMARY OF THE INVENTION

According to the invention there is provided a picture rotation system for producing a rotated picture derived from incoming picture point information, and comprising input means for receiving said information and providing picture point information derived from two incoming video lines simultaneously, means for selecting the degree of rotation required, interpolating processing means for interpolating picture point information selected from said two lines, means for determining the relative proportion of said selected picture points used by said interpolating processing means, frame storage means for storing said interpolated picture information, and sequencing means for determining the modified sequence of frame store locations accessed to receive the processed information to effect relative rotation of said picture information.

Further according to the invention there is provided a picture rotation method for producing a rotated picture derived from incoming picture point information, and comprising receiving said picture point information and providing picture point information derived from two incoming video lines simultaneously, selecting the degree of rotation required, interpolating picture point information selected from said two lines, determining the relative proportion of said selected picture points used in said interpolating steps, storing said interpolated picture information in selected storage locations to build up a frame of rotated picture points, and determining the modified sequence of the storage locations accessed to receive the processed information to effect relative rotation of said picture information.

BRIEF DESCRIPTION OF THE DRAWINGS

The invention will now be described by way of example with reference to the accompanying drawings, in which.

DESCRIPTION OF PREFERRED EMBODIMENT

Figure 1:
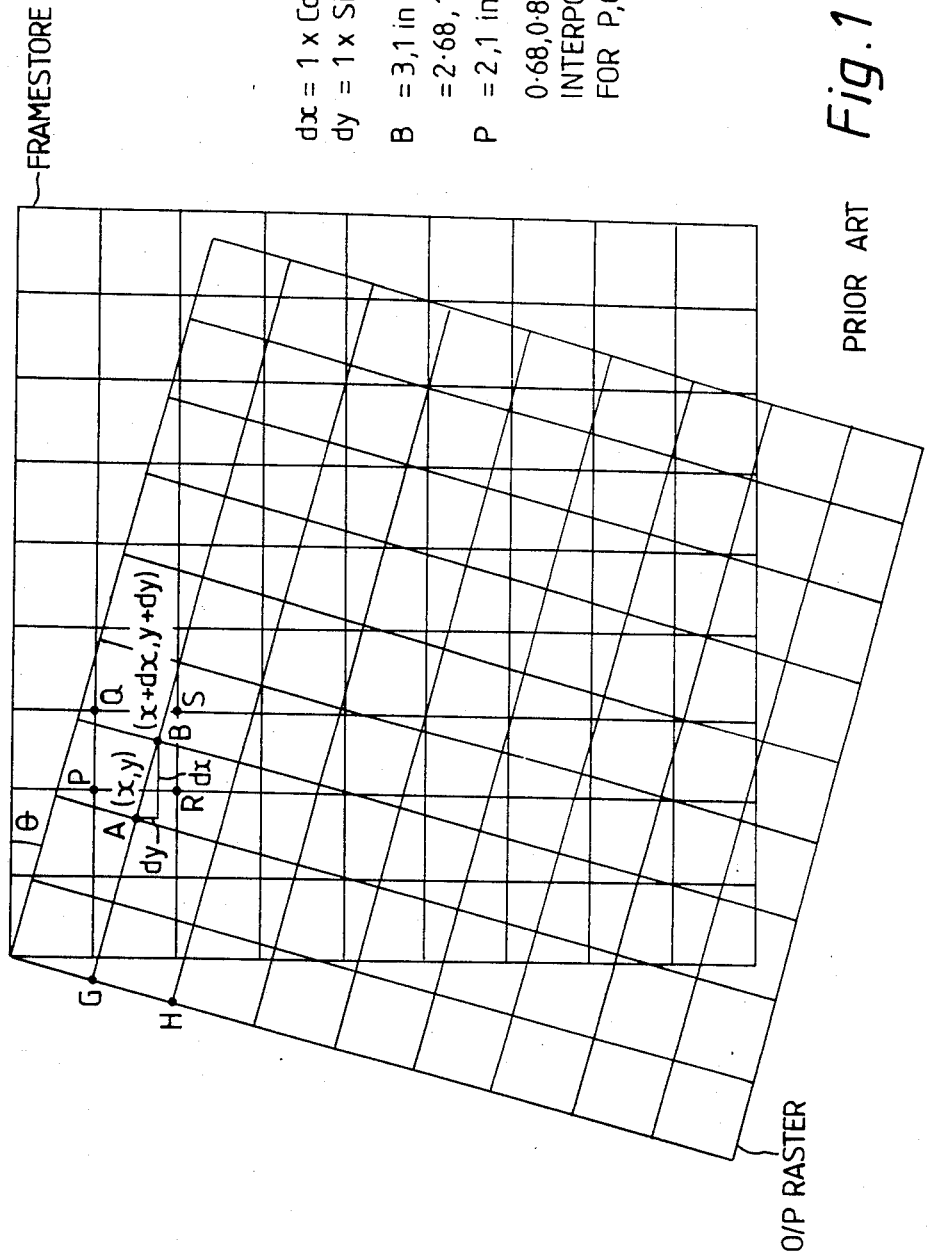
FIG. 1 shows a prior art rotational system.
Figure 3:
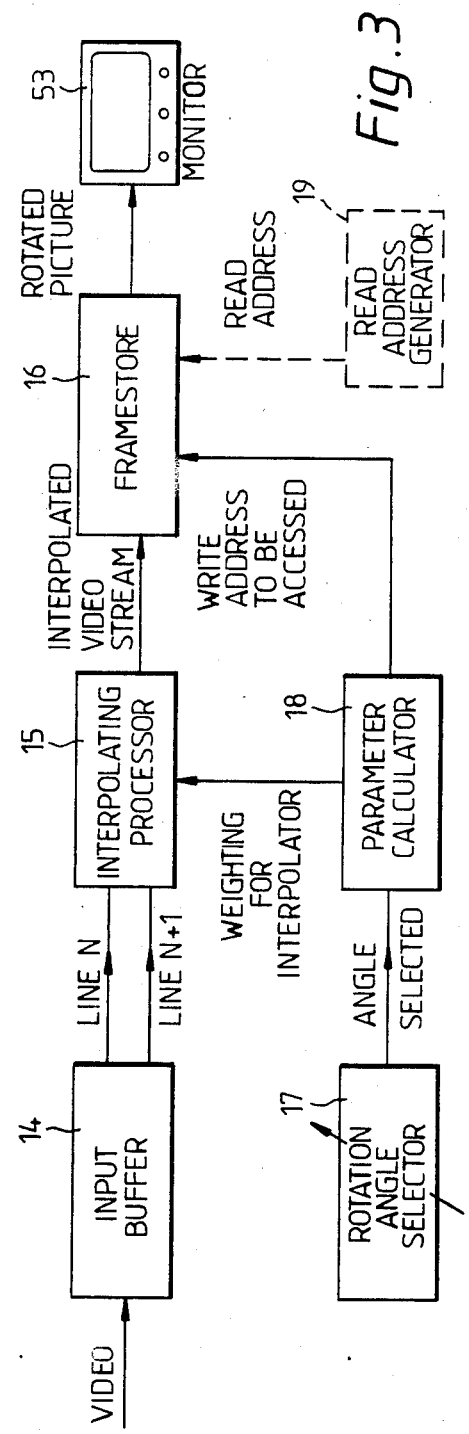
FIG. 3 shows an embodiment of the system of the present invention.

FIG. 3 shows an embodiment of the present invention. Unlike the system which generates a rotated picture at the output from the framestore and thus has access to the entire frame when manipulating the picture, the present arrangement has only access to the actual incoming picture stream, and so input buffer 14 is provided to allow sufficient data to be made available for interpolation within interpolating processor 15. This interpolated data is then written into selected modified locations within the framestore 16. Thus the rotated frame is built up pixel by pixel within the store 16 as it is written into the computed addresses. The sequence of write-in addressing of the framestore 16 will bear no resemblance to the normal address sequence. However, a standard read-out addressing cycle using generator 19 will cause the rotated picture to be output for display on monitor 53. The angle selector 17 can be used to select a desired angle of rotation and this is used by parameter calculator 18 to compute the interpolation values and the required address to be written into framestore 16 to build up the rotated picture. The incoming information available for processing is not sufficient to use the processing mechanisms used in the aforementioned arrangement because only limited picture information is available at any given time. This can be illustrated from the new processing configuration of FIG. 4 in comparison to the FIG. 1 configuration. From this comparison it will be seen that the input raster I/P can now be considered as having been rotated from the position shown into a normal image in the framestore from the vertical and horizontal aspect. This transformation is more complex as in this case for example we have found that we need to know about the point P in the framestore (which is this case stores the rotated image) into which we are about to write (rather than point P from which we were about to read, see the FIG. 1 arrangement). We need to know its position within the framestore raster and also the cell A, B, C, D (of the image prior to rotation) in which it sits within the input raster. In addition we also need to be able to calculate the correctly interpolated value for it and therefore need to know the two fractional parts in that cell, namely JX,JY.

Figure 4:
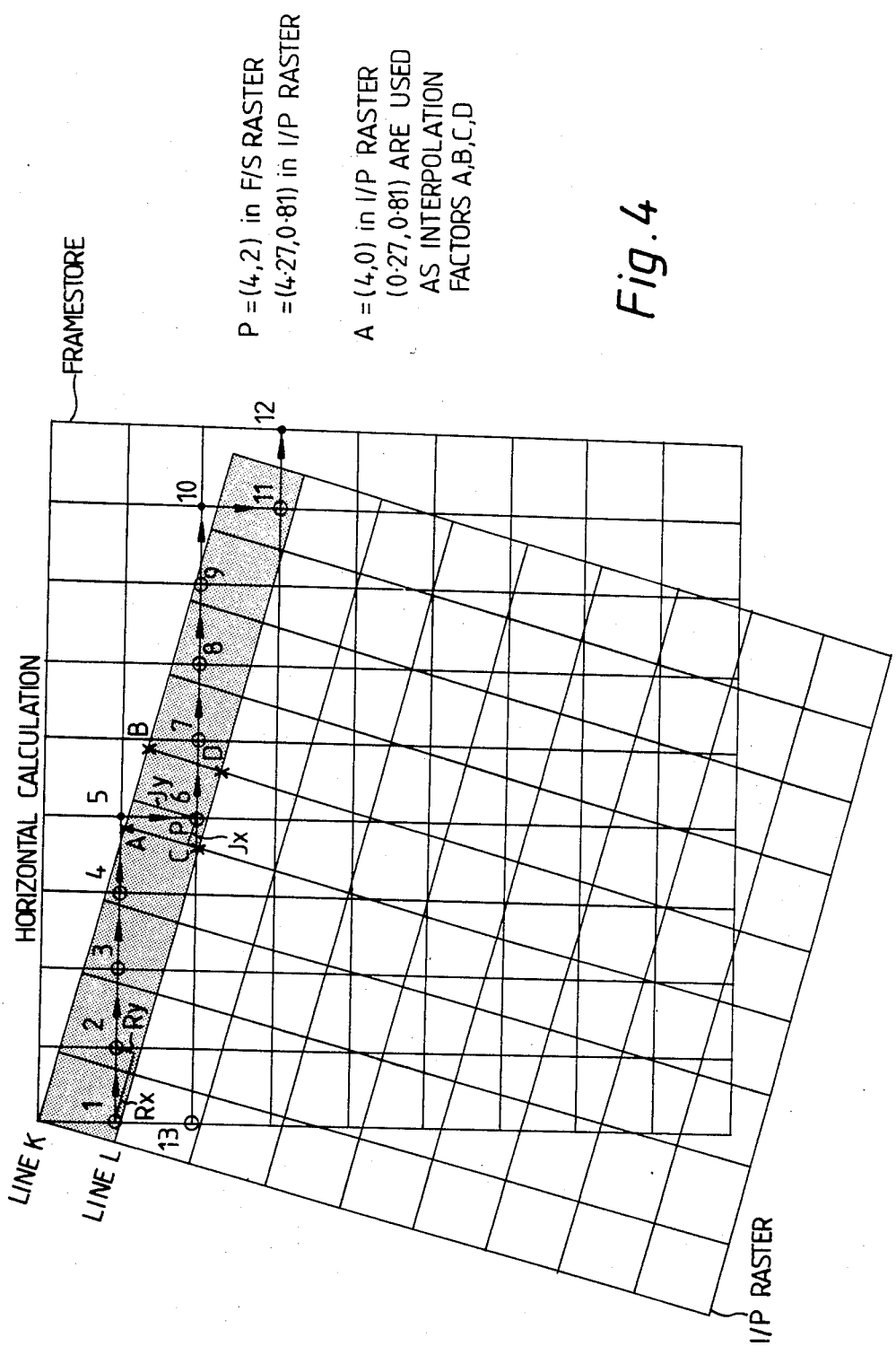
FIG. 4 shows the parameter calculation steps of the system of the present invention concerned with horizontal picture point derivation.

If we are currently accepting Line L from the input raster (the image prior to rotation) and have stored Line K in a line buffer from the previously input line, then we need to know detailed information about all the points which lie between the boundaries of these two lines indicated by the shading on the diagram of FIG. 4. These points in this example are points 1-4, 6-9 and point 11 of the rotated image, and are marked with a large circle for identification purposes on the diagram. It can thus be seen that there is no simple relationship for calculating the necessary step in the co-ordinates between successive points along the shaded area.

Clearly the parameter calculator and processing system used has to be sufficiently sophisticated to determine whether a given point to be written into the frame store has the information currently available to it to allow synthesis of that particular point of the rotated image to be achieved. Thus in the example in FIG. 4, whilst points 1 to 4 of the rotated image can be synthesised for storage from adjacent data within lines K and L of the image prior to rotation, there is not sufficient adjacent data for points 5 or 10, for example, and thus to avoid image degradation the present system is made capable of judging what points are available.

In the embodiments of the invention now to be described we have employed a system which is capable of making decisions as to which of the picture points are to be used for the rotational calculations.

The method we use to calculate the correct address is basically a 'hunting' algorithm to search out where the next correct point is going to be. Thus hunting algorithm is required to follow a fixed set of rules which are now described with reference to FIG. 4 for dealing with horizontal computations.

Assume line K of the image prior to rotation has been stored in line buffer 14 and line L is now coming in to the system. If we start from a point of the rotated image which is valid, in the sense that it is in the shaded area between input lines K and L (in this example, point 1), then to calculate the next valid point of the rotated image we take a horizontal step along the framestore raster to point 2. To calculate the position of this point on the input raster (i.e., the image prior to rotation) we add on the steps RX and RY to the known co-ordinates of position 1. Position 2 is also a valid point and so is written to the framestore after interpolation in interpolator 15 using an interpolation algorithm described below. This write in process continues until point 5. We now find that the Y co-ordinate has gone outside the range of the shaded area within lines K and L and therefore 5 is not a valid point. Since the Y co-ordinate is less than K then we must take a step in the framestore raster Y direction to position 6 (point P) as indicated in the diagram. The co-ordinates of position 6 in the input raster is again calculated by adding on RX and RY for a vertical step in the framestore raster.

We now find that the co-ordinates of position 6 lie within the area K to L and therefore we have a valid point.

Using this method of calculation, the integer part of the co-ordinates of position 6 define the cell in the input raster in which that point belongs. The fractional parts provide the information to give the correct proportions of the surrounding points of that cell and therefore, provide a correctly interpolated value for insertion as point P within the framestore.

Point P of the rotated image is equivalent to co-ordinate location 4,2 in the framestore raster is this example and, say, (4.27, 0.81) relative to the input raster.

Point A is at location 4,0 in the input raster and values (0.27, 0.81) are used as interpolation factors for A, B, C, D to calculate the pixel value of point P.

Thus, it is necessary not merely to move horizontally along the framestore raster to compute the points of interest using interpolation techniques but there is a requirement as shown to ensure that the computation can step vertically as required to keep within the input raster lines K,L, otherwise points will be missed.

A set of rules for the horizontal tracking which will give the desired control to achieve the 'hunting' mechanism required is shown below and which, in this example, is suitable for handling any rotational angle between 0° and 45°, and Y is the current co-ordinate reference to the input raster.

Hunting algorithm rules for $0° \leq \theta < 45°$ (horizontal)

Y<K then add a framestore vertical step (V step)
Y≥L then add a framestore horizontal step (H step)
K≤Y<L then a valid point is present and
(i) calculate the interpolation from adjacent incoming points and write result into framestore.
(ii) test if adding a frame store vertical step will produce a valid point. If not then add a framestore horizontal step.

We have found that the inclusion of the test at (ii) ensures that valid points for computation and storage are never missed.

Figure 5:
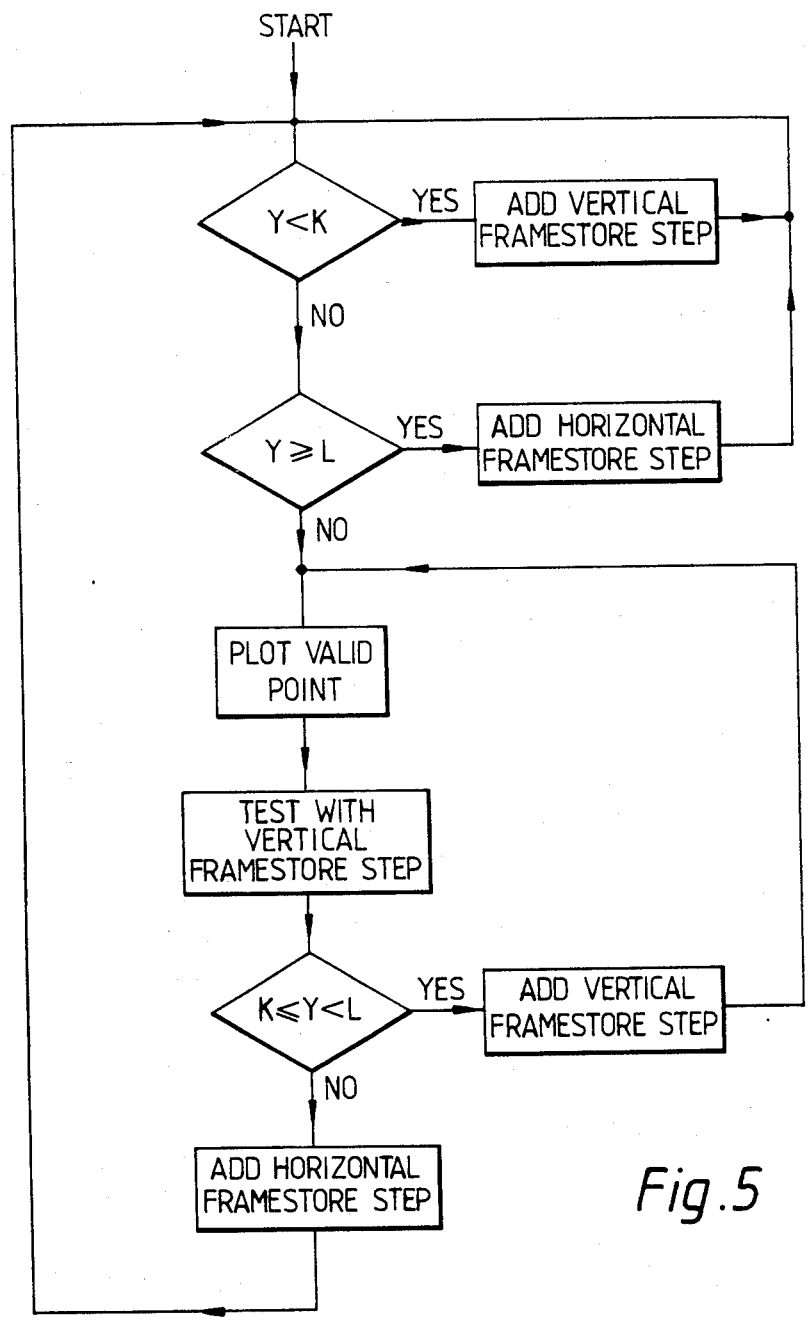
FIG. 5 shows a flow chart representing the writing algorithm used to determine the required picture points to be stored at any given time.

The above algorithm can be translated into the flow chart of FIG. 5.

Figure 6:
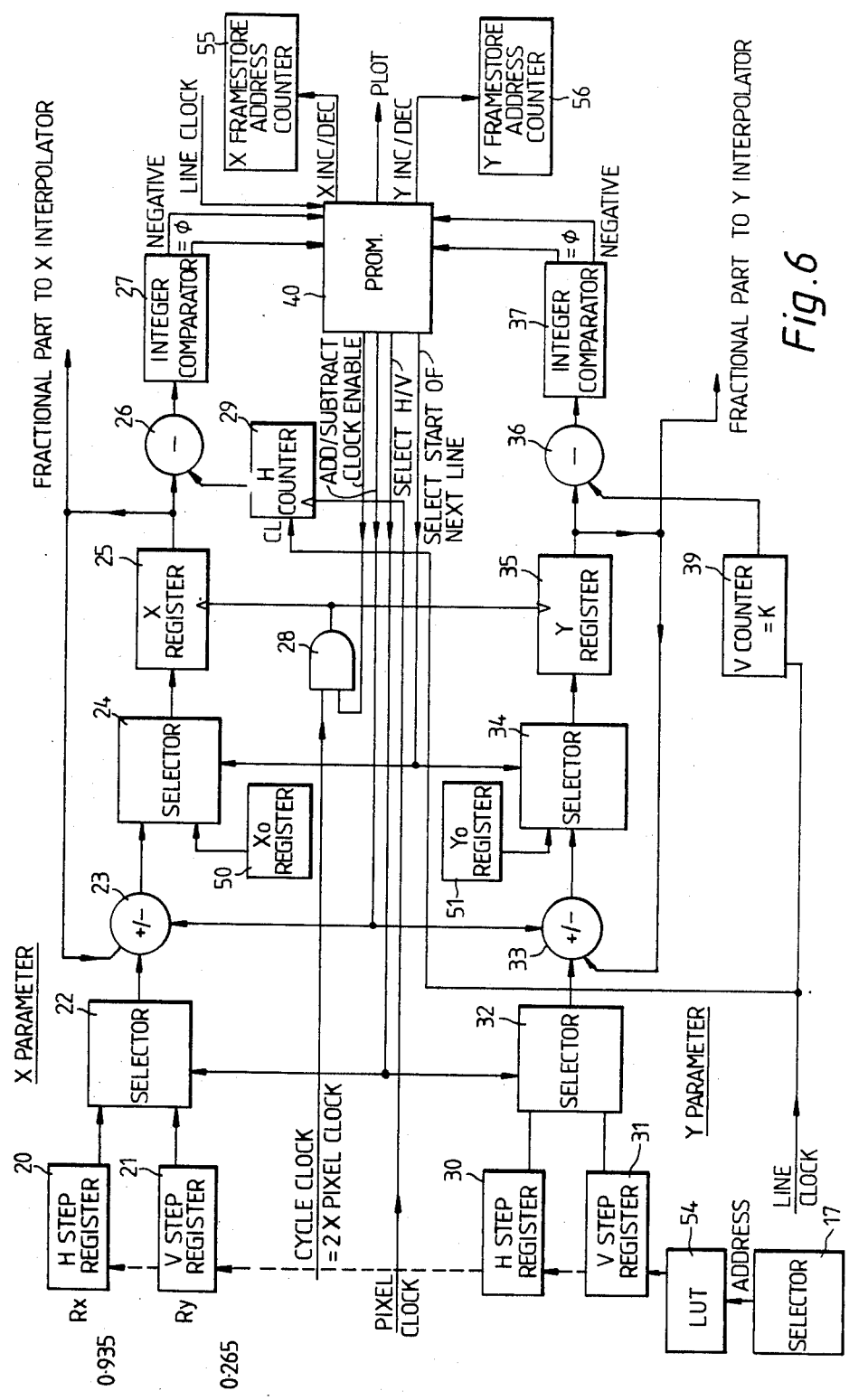
FIG. 6 shows an arrangement capable of achieving this operation.

A system capable of producing the required stepping control in line with this algorithm is shown in FIG. 6 and which is also concerned with determining the horizontal calculations for each picture point and the interpolation coefficients relating thereto.

The desired angle of rotation can be provided by selector 17 which can typically comprise a digital shaft encoder which produces an output at a given angle which can be used as the address for the look-up table (LUT) 54 which is preprogrammed with corresponding step values for Rx and Ry for that angle.

The accessed values are passed to horizontal and vertical step registers 20 and 21 so as to respectively hold these values Rx and Ry (see FIG. 4) which will be entered as fixed values for that angle of rotation. Thus the magnitude of the step values will depend on the angle selected and degree of compression. In the FIG. 4 example these values could be 0.935 and 0.265 respectively. The horizontal or vertical values are available for selection via selector 22 so as to pass to adder/subtractor 23.

The output of adder/subtractor 23 is received by selector 24 which also receives information from X origin register 50 (described in more detail with reference to FIG. 10). The output from selector 24 passes to X register 25 which is clocked at cycle clock rate via AND gate 28. In this example the cycle clock can be twice that of the input pixel clock rate. The digital output is passed to subtractor 26 and fed back to adder/subtractor 23. The fractional part of the register 25 output is used for the X interpolator as explained in more detail with reference to FIG. 7 below. The subtractor 26 receiving the register 25 output also receives the output from horizontal pixel counter 29 clocked at pixel rate and which can be cleared at the end of each line by means of the line clock. The output of subtractor 26 passes to comparator 27 which compares the integer part of the subtractor output to a reference equivalent to zero and produces control signals dependent on the comparison results.

A similar operation is provided for the Y ordinate. Horizontal and vertical step registers 30 and 31 hold the step magnitude value associated with the Y parameter and are connected to selector 32 and the selected output passes to adder/subtractor 33 and the output thereof is received by selector 34 as well as the output from Y origin register 51 (see FIG. 10). The selected output passes to Y register 35 clocked at cycle clock rate and the output thereof is received by subtractor 36 and adder 33. The fractional part is also used for the Y interpolation as described in FIG. 7. The subtractor 36 receiving the output from register 35 also receives the output from vertical counter 39 clocked at line rate. The counter 39 output is equivalent to the position of line K of FIG. 4. This counter can also be used as necessary to define line L as this is equivalent to K+1. The subtractor output passes to comparator 37 which compares the integer portion with zero and this decision produces the desired control signals.

These decisions are made possible because counters 29 and 39 hold the original X and Y address of the current pixel which address is unmodified relative its normal frame address. Registers 25 and 35 hold the modified frame addresses projected back onto the raster.

The sequence of operations through the system to achieve the stepping function is controlled by the PROM 40 which effectively is preprogrammed to follow the flow chart operation of FIG. 5.

The PROM outputs include a clock enable signal for the AND gate 28 to allow the X and Y registers 25 and 35 to be updated at cycle clock rate, an ADD or subtract control for blocks 23 and 33, a control for selecting either horizontal and vertical step values for selectors 22 and 32, and a control for selectors 24 and 34 dependent on the start of line. Start of line information is provided at the input to PROM 40. The PROM also produces a plot output as well as an X and Y increment/decrement control for the framestore address counters 55 and 56. The decisions produced by the comparators 27 and 37 effectively modify the output combination produced by the PROM to cause different status control signals for the system so as to follow the FIG. 5 mode of operation. Thus a decision by comparator 37 that Y<K as determined by subtracting in block 36 the Y register 35 output and V counter 39 output then the PROM will produce a framestore Y address increment for counter 56, a clock enable to again load register 35, and cause an add select for blocks 23 and 33 and a select V for blocks 22 and 32.

Similarly for a horizontal step decision to be made, then values from register 20 and 30 are entered via selectors 22 and 32 and after adding and passing via selectors 24 and 34 are loaded into X register 25, and also a X framestore address increment to counter 55 is provided.

Figure 7:
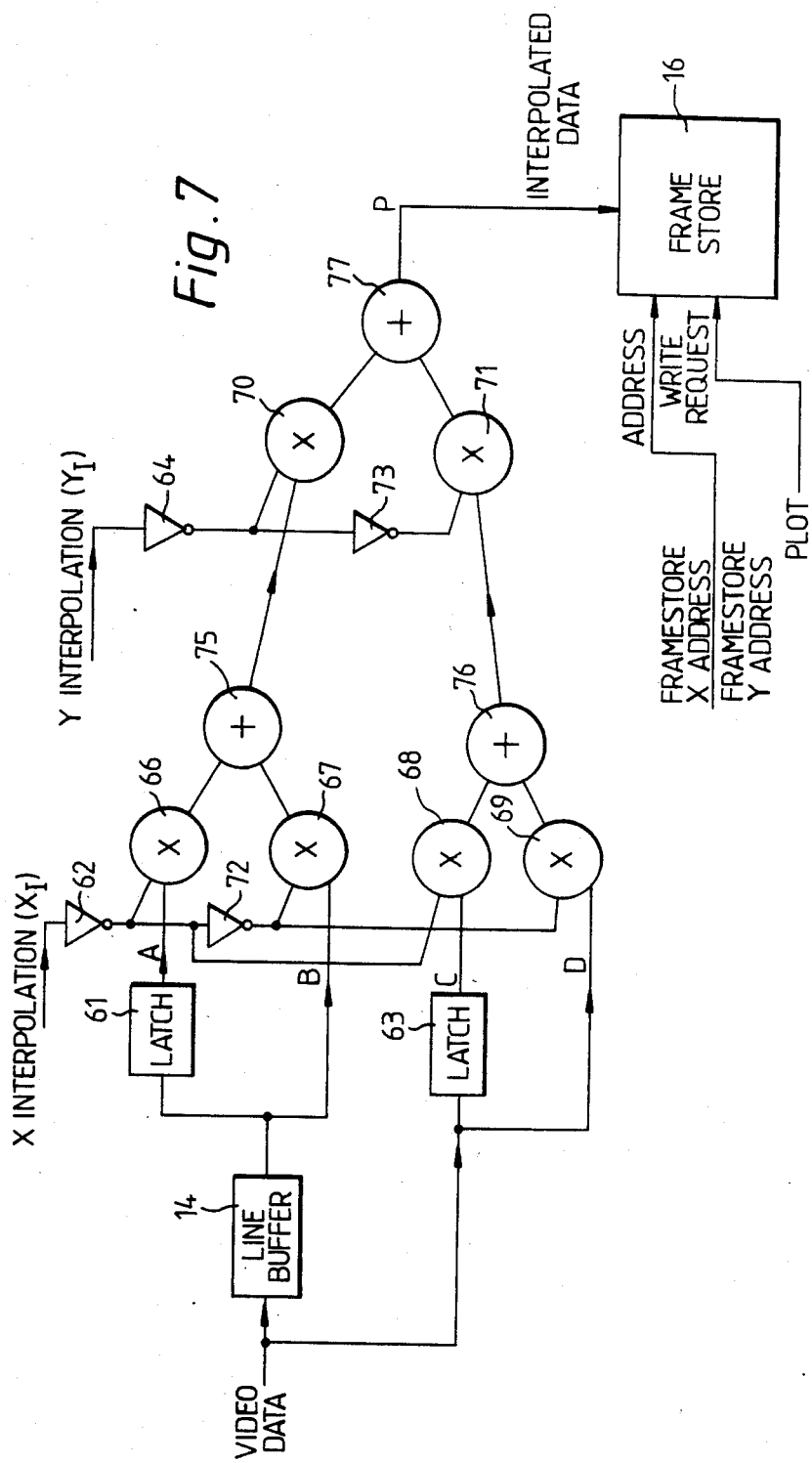
FIG. 7 shows an interpolator suitable for use with the FIG. 6 arrangement.

Thus the arrangement not only determines the modified framestore address but the fractional result from X and Y registers 25 and 35 are used to provide necessary interpolation information as now discribed with reference to FIG. 7, and which corresponds generally to blocks 14, 15 and 16 of FIG. 3.

The incoming digital video passes to line buffer 14 which provides a single line delay to ensure that point A of FIG. 4 is received by the interpolators simultaneously with point C. These points are held by latches 61 and 63 respectively to provide a single pixel delay, whilst the next points B and D are used as they arrive. The new picture point P is generated from information on these 4 adjacent pixels according to the formula:

$$P=(1-YI)\cdot[(1-XI)\cdot A+XI\cdot B]+YI\cdot[(1-XI)\cdot C+XI\cdot D)]$$

The interpolators comprise multipliers 66–71, adders 75–77 and inverters 62, 64, 72, 73. The coefficient values for X and Y used in the multipliers are provided by the fractional part of the computation available from register blocks 25 and 35 respectively of FIG. 6. The outputs from address counters 55 and 56 of FIG. 6 are used to define the X and Y framestore addresses for writing into framestore 16 and the plot output from PROM is used as the framestore write request. Thus it can be seen that the FIG. 6 and 7 arrangements when combined provide the picture rotation requirements of the present invention as shown in FIG. 3 for the horizontal calculations. Although the picture points are written into the framestore 16 in a variable sequence, the read addressing of the framestore will be arranged to produce the standard line and picture point addressing sequence in normal manner.

Figure 8:
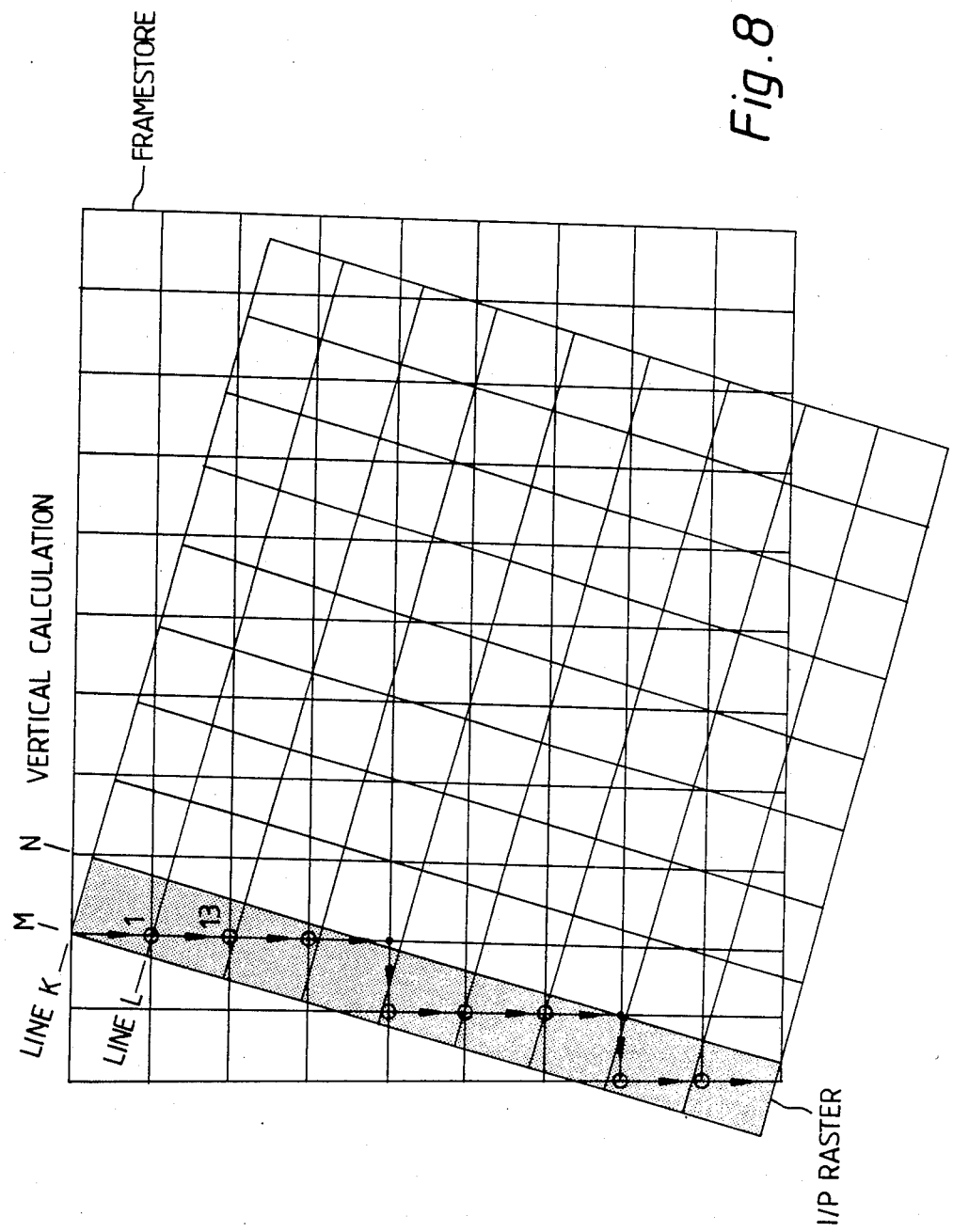
FIG. 8 shows the vertical parameter calculations required for the present system.

The requirement for the X and Y origin registers 50 and 51 respectively of FIG. 6 will now be explained in more detail. The FIG. 4 arrangement shows the first point to be synthesised as using adjacent pixels from the incoming raster which includes the first pixels in the lines therefrom. In practice the point of origin of the first point to be synthesised may be displaced to the right in the framestore as now illustrated in FIG. 8 so that this requirement must be taken into account by the system if it is to operate correctly in such a situation. This value relative to the origin is stored in the registers 50 and 51 of FIG. 6. It can be seen that the initial points to be synthesised for a given line must be taken from within the shaded area within the boundaries of lines M and N. Thus point 1 to be synthesised written into the framestore is not located at position 1 in the framestore. (Position 1 in the framestore has no information available to it for computation).

From point 1 successive points from within the lines K and L are synthesised and written into the framestore as in the FIG. 4 illustration and then point 13 will be the origin for the next track using information from line L and the next adjacent line.

For example, we have found that the following set of rules will enable all the relevant points of origin to be tracked when handling any angle between 0° and 45° referenced to the line origin.

Hunting algorithm for $0° \leq \theta < 45°$ (vertical)

Figure 9:
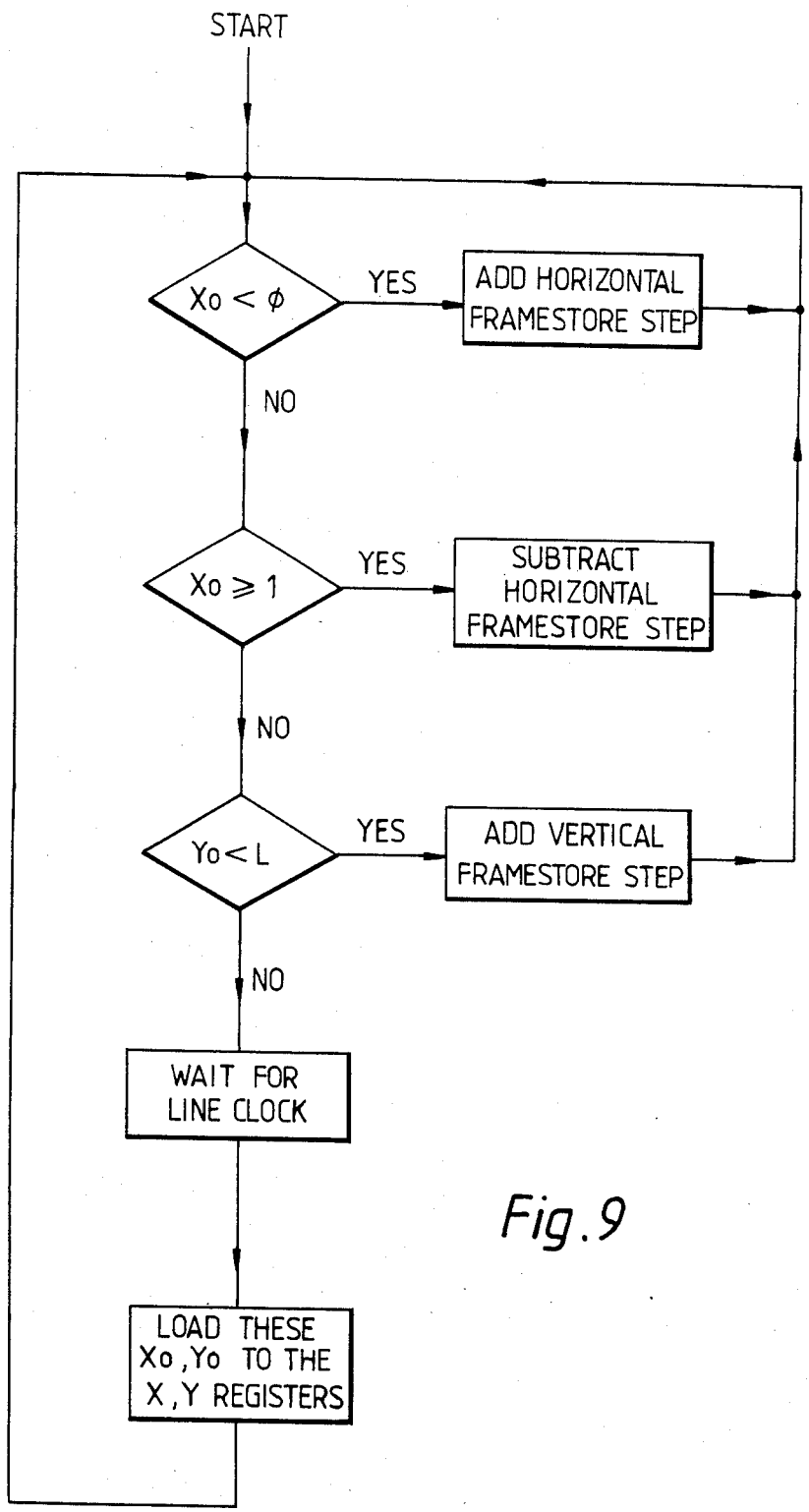
FIG. 9 shows a flow chart representing the algorithm associated with FIG. 8.

If $X_{ORIGIN} < 0$ then add a framestore horizontal step
$X_{ORIGIN} \geq 1$ then subtract a framestore horizontal step
$0 \leq X_0 < 1$
(i) if Y origin $<$ L then add a framestore vertical step
(ii) if Y origin $>$ L then wait for line clock The above algorithm can be translated into the flow chart of FIG. 9.

Figure 10:
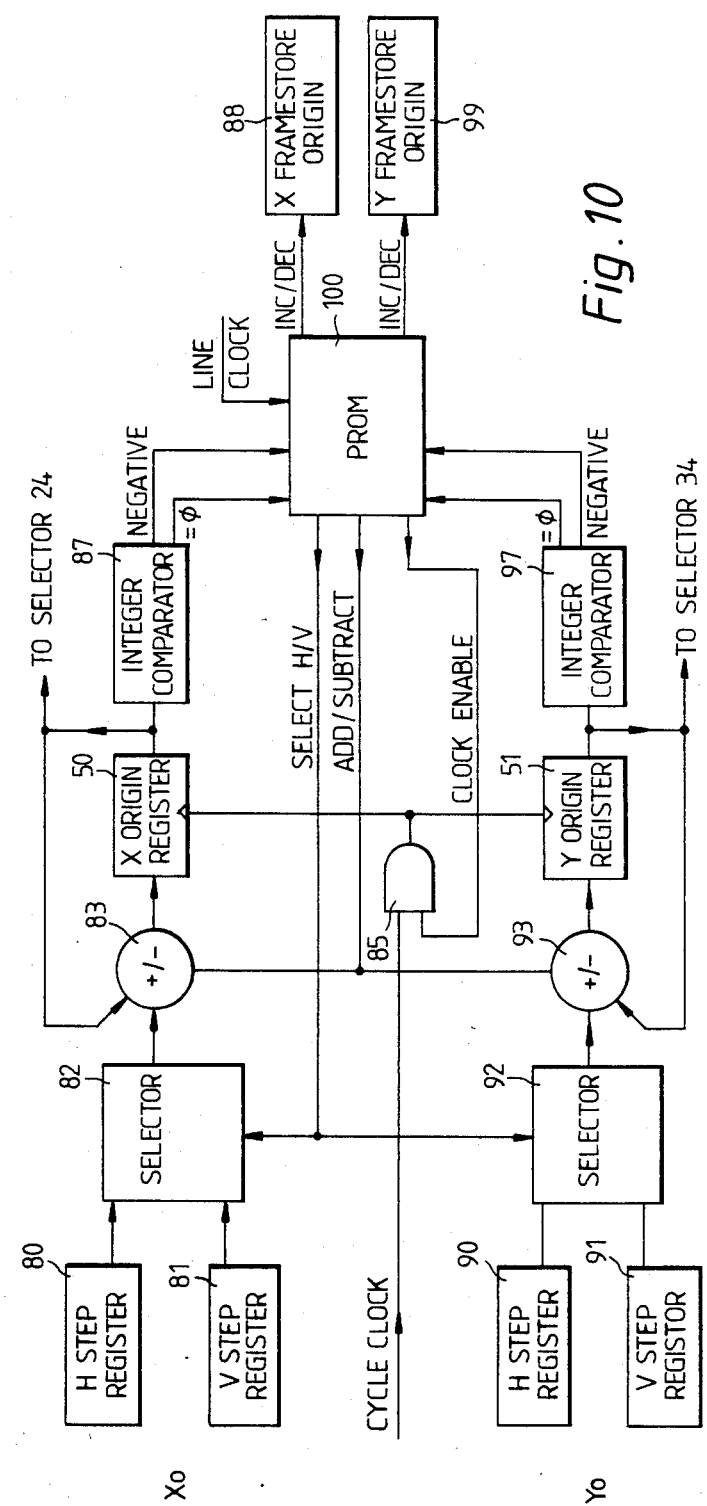
FIG. 10 shows an arrangement capable of achieving this operation.

A suitable system capable of producing this operational requirement is shown in FIG. 10.

The basic values of Xo and Yo for the given angle (available from a look-up table for example) are entered into registers 80,81 and 90,91 respectively. The respective values are available to give the desired horizontal and vertical steps via selectors 82 and 92 under the control of the output from PROM 100, preprogrammed to follow the steps as described in the flow chart of FIG. 9. The selected outputs are received by adder/subtractors 83,93, their functions being controlled by the logic state of the PROM output. The outputs from blocks 83,93 are received by respective registers 50,51 clocked at cycle clock rate under enabling control of PROM 100 via AND gate 85. The output from Xo register 50 is also made available to X register 25 (see FIG. 6) via selector 24. Similarly the output from Yo register 51 is also made available to Y register 35 of FIG. 6 via selector 34. The outputs from the registers 50 and 51 are also available to adder/subtractors 83, 93 respectively, and comparators 87,97 respectively. The comparison step consists of comparing the integer part of the register output with reference to zero. A negative result or equality changes the control parameters provided by the ROM 100 in line with FIG. 9. The ROM receives clocks at line rate as part of its sequential operation. Dependent on the comparison decision causes the X framestore origin counter 88 or Y framestore origin counter 99 to be incremented or decremented. The values within these origin counters are loaded into framestore address counters 55 and 56 at the appropriate time, i.e., when the selectors 24 and 34 operate to select registers 50 and 51 at the start of line.

Figure 11:
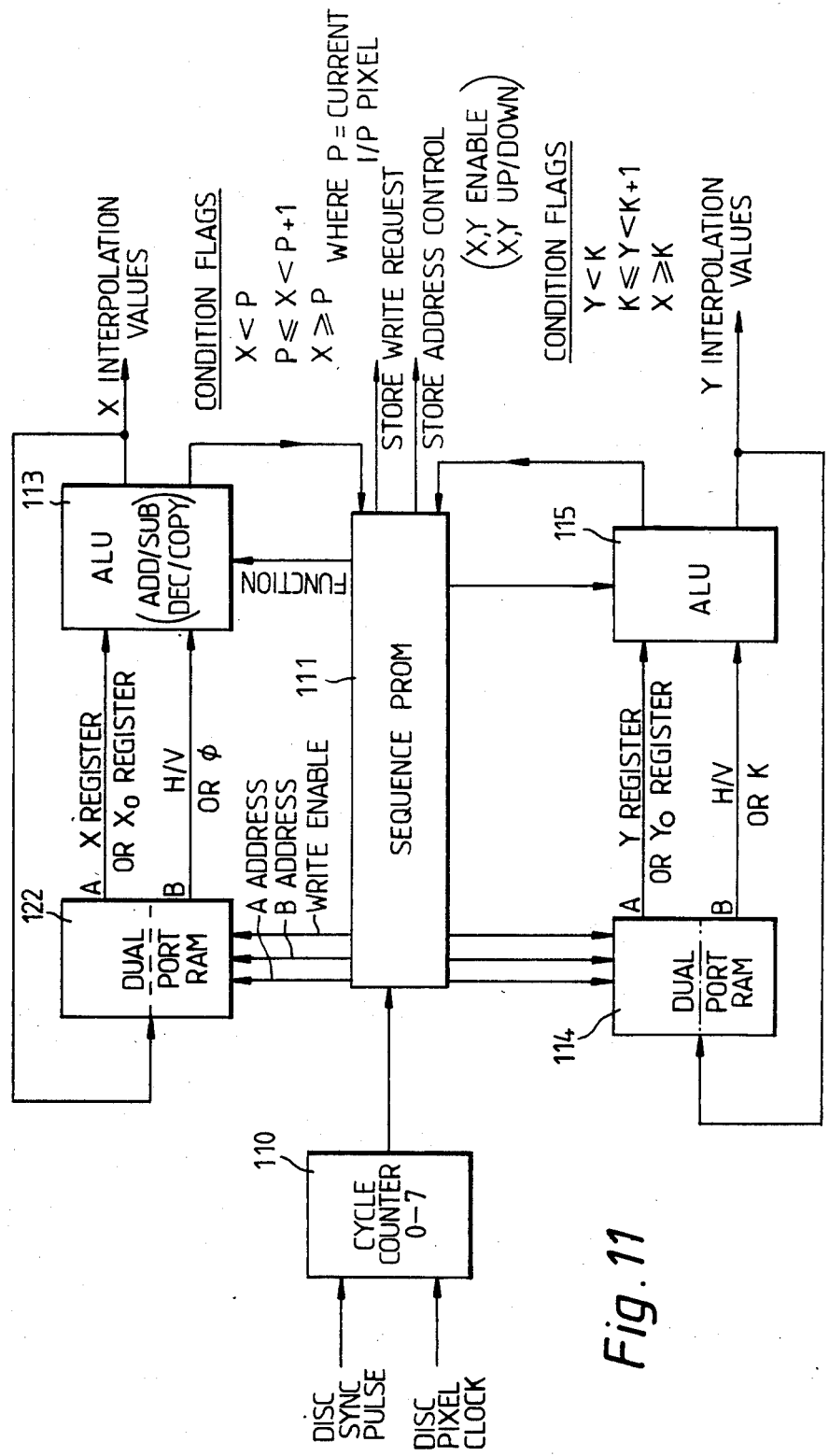
FIG. 11 shows an alternative combined embodiment to that of FIGS. 6 and 10.

Although the system can be considered as handling standard real time incoming picture information previously converted into digital form, the incoming information can also be provided from non-real time picture sources such as disc stores. With this in mind the FIG. 11 configuration shows an arrangement which combines the operations of FIGS. 6 and 10 but is shown by way of example as receiving incoming clock and synchronising information derived from a disc source. The video information from the disc will be processed as before using the FIG. 7 arrangement, although it may be possible to arrange the picture information from a previous data processing function to be directly taken from two lines without the need for the separate line buffer 60.

The synchronisation for the system at disc rate is received by cycle counter 110 which cycles each 8 clocks so that each of the 8 counter output states causes a different operational sequence control to be effected by PROM 111. The PROM is preprogrammed to be capable of providing the dual operational capabilities of the separate PROMs of FIGS. 6 and 10. The registers and associated arithmetic components of FIGS. 6 and 10 are now provided by dual port RAMs 112,114 and arithmetic and logic unit (ALU) 113,115. The PROM 111 provides a control to output the address of two RAM ports A and B as well as a write enable to RAM 112 dependent on the particular sequence state of the cycle from counter 110. The first port of the RAM provides outputs using the A address which can be the X register or the Xo register value dependent on the PROM control. The second port of the RAM provides outputs on using the B address which can be the horizontal or vertical register output or zero. These outputs are received by ALU 113 which will simultaneously receive a further control from PROM 93 so that the ALU can perform the desired function of add, subtract, decrement or copy to produce the X interpolation values and the condition flags for the PROM indicative that $X < P$ or $P \leq X < P+1$ or $X \geq P$ (where P is the current input pixel).

The dual port RAM 114 produces the Y register or Yo register output from the first port and the horizontal or vertical step on the line numbered K from its second port. The line number L can be determined from this as before because $L = K + 1$. The ALU 115 will function dependent on the control from PROM 111 to produce the Y interpolation values and the condition flags indicative of whether $Y < K$ or $K \leq Y < K+1$ or $Y \geq K$ for use by the PROM 111.

The PROM can then decide whether to request a framestore write and to give the store address control for x,y increment enable and x,y up or down direction.

Typically the eight PROM operations within the cycle sequence can be represented as follows:

| Cycle stage | | |
|---|---|---|
| 0 | Determine K − Y | } horizontal |
| 1 | Add/subtract framestore step dependent on condition flags | |
| 2 | Determine O− X to test X | } ORIGIN |
| 3 | Add/subtract framestore step ORIGIN dependent on condition flags | |
| 4 | Determine K − Y | } horizontal |
| 5 | Add/subtract framestore step | |

| -continued |
| --- |
| Cycle stage |
| dependent on condition flags |
| 6  Load a register (if required) |
| 7  Increment Horizontal counter |
| or clear horizontal counter and load |
| Xo—x |
| Yo—y |
| if line clock present |

Although the RAM 112,114 and ALU 113, 115 are shown as separate items, these can conveniently be incorporated within a bit slice microprocessor chip.

Figure 2:
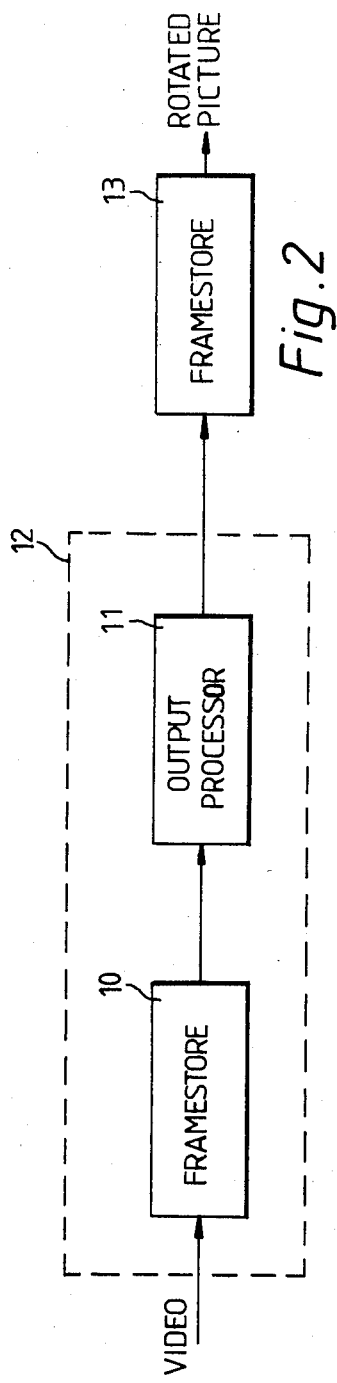
FIG. 2 shows an arrangement adapted to use the FIG. 1 rotation by employing an extra frame store to provide a rotation system capable of rotating incoming information.

Thus unlike the prior art system for FIG. 2 which includes a processor which can assume that a whole frame of picture points is available for rational processing; because the processor is at the output of the framestore, the present system described above is of a configuration which is sufficiently intelligent to be able to determine which information is currently available (typically information from two lines only) and to know which is the next picture point in a sequence which can be synthesised without making errors in selection.

I claim:

1. A picture rotation system for producing a rotated picture from an incoming picture comprising video lines of picture point information, comprising:
   input means for receiving said video lines and for concurrently providing two adjacent video lines of picture point information;
   means for selecting a degree of rotation of the incoming picture required to derive a desired rotated picture;
   interpolating processing means responsive to selected picture point information provided by the input means for interpolating picture point information for the rotated picture;
   means responsive to the selected degree of rotation for calculating (i) a fractional part applied to the interpolation processing means for determining relative proportions of the selected picture point information used by the interpolating processing means for interpolating picture point information for the rotated picture and (ii) an integer part identifying coordinates for picture point information in the rotated picture;
   a framestore for storing said interpolated picture point information for the rotated picture; and
   sequencing means responsive to said integer part for determining an accessing sequence of framestore locations to receive the interpolated picture point information for the rotated picture to effect rotation of said picture point information of the incoming picture.

2. A system according to claim 1, wherein the sequencing means includes a verification device for determining whether the accessed framestore locations will be within the boundaries of the incoming picture point information currently available from said input means.

3. A system according to claim 2, wherein said verification means includes an address stepping mechanism for effecting horizontal or vertical address step adjustment where a framestore location to be sequenced is determined to be outside the incoming picture point information currently available from the input means.

4. A system according to claim 3, wherein said address stepping mechanism comprises means for providing incremental pixel location values for a chosen angle of rotation, means for comparing the coordinates of picture points currently available from the input means with the store locations to be accessed to determine whether the framestore locations are coincident with said coordinates.

5. A system according to claim 1 including origin determining means for providing information indicative of the displacement of the origin of the rotated picture relative to the origin of the incoming picture.

6. A system according to claim 5, wherein said origin determining means includes a memory for holding origin displacement values accessible in dependence on the rotation selected, and comparator means for determining, on the basis of said origin displacement values, whether a current framestore location corresponds to a correct framestore location for the start of a line of the rotated picture.

7. A system according to claim 1 wherein said input means includes a line buffer store.

8. A system according to claim 1 wherein said interpolating processing means includes a latching device for temporarily holding picture point information to allow a plurality of picture points of the incoming picture, defining a picture area, to be available and an arithmetic processor for generating interpolated picture point information therefrom under the control of said proportion determining means.

9. A picture rotation method for producing a rotated picture from an incoming picture comprising video lines of picture point information, comprising:
   receiving said picture point information and concurrently providing picture point information derived from two incoming video lines;
   selecting a degree of rotation of the incoming picture required to derive a desired rotated picture;
   interpolating picture point information for selected picture points for the rotated picture from picture point information for picture points selected from said two video lines, taking into account said selected degree of rotation;
   determining relative proportions of said selected picture points of the incoming picture used in said interpolating step to interpolate the information for the selected picture points of the rotated picture;
   storing said interpolated picture point information in selected storage locations to build up a frame of picture points for the rotated picture; and
   determining an accessing sequence of the storage locations accessed to receive the interpolated information for picture points to effect rotation of said incoming picture.

10. A method according to claim 9, wherein the sequencing step includes verification to determine whether the accessed storage locations will be within the boundaries of the incoming picture information from the two video lines currently available.

11. A method according to claim 10, wherein said verification step includes effecting horizontal or vertical storage location address step adjustment where a storage location address to be sequenced is determined to be outside the incoming picture point information currently available.

12. A method according to claim 11, wherein said address adjustment includes providing incremental storage location addresses for a chosen angle of rotation, comparing the coordinates of currently available picture points of the incoming picture with addresses of selected storage locations to determine whether coincidence exists, and modifying the store locations to be accessed to determine whether the modified locations are coincident with said coordinates.

13. A method according to claim 9 including the steps of providing information indicative of the displacement of the origin of the rotated picture relative to the origin of the incoming picture and checking whether the storage address at the start of each line of the rotated picture is consistent with said displacement.

14. A method of rotating an incoming video frame comprising:
  selecting an angle defining a rotated frame to be derived by rotating the incoming frame therethrough;
  providing values of pixels from two lines at a time of the incoming frame, wherein successive pairs of said lines define successive bands across the incoming frame;
  identifying locations of pixels of the rotated frame which would be within the currently provided band if the incoming and rotated frames were superimposed spatially;
  interpolating pixel values for identified locations of pixels from the values of pixels within the current band whose locations would be adjacent to the location of the pixel whose value is being interpolated if the two frames were superimposed spatially; and
  storing the interpolated pixel values at respective storage locations of a framestore to thereby build up the rotated frame therein.

15. A method as in claim 14 in which:
  the identifying step comprises finding the coordinates of a point in the incoming frame where a given pixel of the rotated frame would be if the incoming and rotated frame were superimposed spatially, each coordinate having an integer part and a fractional part in the coordinate system of the incoming frame;
  and the interpolating step comprises using the integer parts to define a cell of the incoming frame which matches spatially the given pixel of the rotated frame, and using the fractional parts to define the contributions which the values of the pixels of that cell make to form the value of the given pixel of the rotated frame.

16. A method as in claim 14 in which the identifying step comprises finding a given pixel of the rotated frame whose location therein corresponds spatially to the current band and, to find another pixel of the rotated frame whose location therein corresponds spatially to the same band, testing if the location of the next pixel along a selected coordinate direction in the rotated frame corresponds spatially to the band and, if not, testing if the location of the pixel next to the given one along another selected coordinate direction in the rotated frame corresponds spatially to the band.

17. A method as in claim 14 in which the identifying step comprises:
  (a) testing if the location of a given pixel in the rotated picture is above the upper currently provided line of the incoming frame in a notional superposition of the incoming and rotated frames; if so, applying this step (a) to the next pixel down in the rotated frame; if not, applying step (b) below to the given pixel; and
  (b) testing if the location of the the given pixel is at or below the lower currently provided line; if so, applying step (a) to the next pixel down in the rotated frame; if not, applying the interpolating and storing steps to said given pixel.

18. A method as in claim 17 in which the identifying step further comprises:
  (c) testing if the location of the next pixel down from the last one to which the interpolating and storing steps were applied, is at or below the current upper line but above the current lower line; if so, applying the interpolating and storing steps to said next pixel down; if not, applying step (a) to the pixel next across to said next pixel down in the rotated picture.

19. A method as in claim 14 in which:
  the selecting step includes defining the spatial displacement between the origin of the incoming frame and that of the rotated frame in a notional superposition of the two frames; and
  the identifying step comprises using said displacement to find the location of the the first pixel of a line of the rotated frame which corresponds spatially to the currently provided band of the incoming frame.

20. A method of rotating an incoming video frame through a selected angle to derive a rotated frame without using two complete framestores, comprising:
  selecting said angle;
  receiving the pixel values of a pair of lines of the incoming frame at a time;
  using said pixel values and the angle to interpolate the values of pixels of the rotated frame which would match the currently received lines spatially if the incoming and rotated frames were superimposed;
  and storing the interpolated pixel values in a framestore in locations corresponding to the spatial positions of the respective pixels in the rotated frame, wherein after the rotated frame is stored the framestore can be read out in video format to display the rotated frame.

21. A method as in claim 20 in which the step of using pixel values of the incoming frame to interpolate pixel values of the rotated frame comprises interpolating each of a plurality of pixel values of the rotated frame from the values of a respective plurality of pixels of the incoming frame, wherein an interpolated pixel value is formed by adding the values of said respective plurality of pixels in proportions depending on their spatial distance from the point at which the pixel whose value is being interpolated would be on the incoming frame if the incoming and rotated frames were superimposed spatially.

22. A system for rotating an incoming video frame comprising:
  means for selecting an angle defining a rotated frame to be derived by rotating the incoming frame therethrough;
  means for providing values of pixels from two lines at a time of the incoming frame, wherein successive pairs of said lines define successive bands across the incoming frame;
  means for identifying the locations of pixels for the rotated frame which would be within the currently provided band if the incoming and rotated frames were superimposed spatially;
  means for interpolating pixel values of at least a plurality of the pixels at the identified locations from the values of respective pixels of the current band which would be adjacent to the pixel whose value is being interpolated if the two frames were superimposed spatially; and a framestore and means for storing the interpolated pixel values at respective storage locations of the framestore to thereby build up the rotated frame therein.

23. A system as in claim 22 in which:

the identifying means comprise means for finding the coordinates of a point in the incoming frame where a given pixel of the rotated frame would be if the incoming and rotated frame were superimposed spatially, each coordinate having an integer part and a fractional part in the coordinate system of the incoming frame; and the interpolating means comprise means for using the integer parts to define a cell made up of pixels of the incoming frame which matches spatially the location of the given pixel of the rotated frame, and means for using the fractional parts to define the contributions which the values of the pixels of that cell make to form the value of the given pixel for the rotated frame.

24. A system as in claim 22 in which the identifying means comprise means for finding the location of a given pixel for the rotated frame which matches spatially the current band and, to find the location of the next pixel for the rotated frame which matches spatially the same band, for testing if the next pixel down in the rotated frame matches spatially the band and, if not, testing if the pixel next to the given one across the rotated frame matches spatially the same band.

25. A system as in claim 22 in which:

the selecting means include means for defining the spatial displacement between the origin of the incoming frame and that of the rotated frame in a notional superposition of the two frames; and the identifying means comprise means for using said displacement to find the location of the first pixel of a line of the rotated frame which matches spatially the currently provided band of the incoming frame.

26. A system for rotating an incoming video frame through a selected angle to derive a rotated frame without using two complete framestores, comprising:

means for selecting said angle;

means for providing pixel values of a pair of lines of the incoming frame at a time;

means for using said pixel values and angle to interpolate values of pixels for the rotated frame which would match the currently received lines spatially if the incoming and rotated frames were superimposed; and a framestore and means for storing the interpolated pixel values in locations in the framestore which correspond to the spatial positions of the respective pixels for the rotated frame.

27. A system as in claim 26 in which the means for using pixel values of the incoming frame to interpolate pixel values of the rotated frame comprise means for interpolating each of a plurality of pixel values of the rotated frame from the values of a respective plurality of pixels of the incoming frame, wherein an interpolated pixel value is formed by adding the values of said respective plurality of pixels in proportions depending on their spatial distance from the point at which the pixel whose value is being interpolated would be on the incoming frame if the incoming and rotated frames were superimposed spatially.

* * * * *